(12) United States Patent
Wagner

(10) Patent No.: US 11,813,225 B2
(45) Date of Patent: Nov. 14, 2023

(54) BATHING SYSTEM FOR AERONAUTS

(71) Applicant: Jimmy Wagner, Brooklyn, NY (US)

(72) Inventor: Jimmy Wagner, Brooklyn, NY (US)

( * ) Notice: Subject to any disclaimer, the term of this patent is extended or adjusted under 35 U.S.C. 154(b) by 0 days.

(21) Appl. No.: 17/680,129

(22) Filed: Feb. 24, 2022

(65) Prior Publication Data
US 2023/0263705 A1    Aug. 24, 2023

(51) Int. Cl.
*A61H 33/14* (2006.01)
*B64G 1/60* (2006.01)

(52) U.S. Cl.
CPC ............ *A61H 33/14* (2013.01); *B64G 1/60* (2013.01)

(58) Field of Classification Search
CPC ................................ A61H 33/14; B64G 1/60
USPC ..................... 4/535–537, 524, 526
See application file for complete search history.

(56) References Cited

U.S. PATENT DOCUMENTS

| | | | | |
|---|---|---|---|---|
| 3,681,788 A | * | 8/1972 | Le Blanc | A47K 3/325 4/602 |
| 5,311,620 A | * | 5/1994 | Ratje | A47K 3/325 4/603 |
| 5,971,188 A | * | 10/1999 | Kellogg | D06F 95/004 190/126 |
| 10,704,281 B1 | * | 7/2020 | Stahlhut | E04H 15/003 |
| 2006/0241535 A1 | * | 10/2006 | Chan | A61H 35/006 601/16 |
| 2010/0168650 A1 | * | 7/2010 | Nakamura | A61H 9/0078 604/24 |
| 2013/0340159 A1 | * | 12/2013 | Barrett | A47K 3/325 4/599 |
| 2015/0047118 A1 | * | 2/2015 | Bilyk, Jr. | A47K 3/325 4/608 |
| 2018/0014698 A1 | * | 1/2018 | Barrett | A47K 3/325 |

* cited by examiner

*Primary Examiner* — Lori L Baker
(74) *Attorney, Agent, or Firm* — Barry Choobin; Patent 360

(57) ABSTRACT

A system and method for cleaning a body of a person. The system includes an envelope extending between a top member and a base member, and several rings disposed between the top member and the base member. The envelope, the top member, and the base member define an enclosure of the system. Each ring has several spaced apart nozzles along its circumference and nozzles connect to an air pump. A person can stand on the base member, while the top member can surround the neck of the person. Air under low pressure can then impinge on the body of the person below the neck to remove dirt and dead skin. The dirt and dead skin suspended in the air are drawn through a vacuum source from the inner volume of the enclosure.

16 Claims, 4 Drawing Sheets

BATHING SYSTEM FOR AERONAUTS

FIELD OF INVENTION

The present invention relates to a system for cleaning a human body using air, and more particularly, the present invention relates to a system for use in human space missions for keeping body hygiene.

BACKGROUND

It is an undisputed fact that body hygiene is of utmost importance for health and well-being. Bathing the body not only removes contaminants from the skin and hair but also gives satisfaction to the mind. Bathing can keep individuals energetic and mindful.

However, in human space explorations, the availability of water is scarce. Bathing in spacefaring vehicles and space stations has been a long-standing and unsolved issue. While the number of human space explorations is rapidly increasing, the proposed solutions in art do not show any desirable method of keeping body hygiene in space missions. Due to scarcity of water in long or deep space missions, the astronauts cannot take baths for days which affects both their health and mental well-being.

Thus, an urgent need is there for a system and method to clean the body from contaminants in space missions. A need is appreciated for a system and method to keep bodily hygiene when availability of water is scarce.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system and method for cleaning the human body in space missions.

It is another object of the present invention to clean the body without using water.

It is still another object of the present invention that the system allows to have a pleasure of bathing in space missions without using the water for mental satisfaction and well-being.

It is yet another object of the present invention that the system can be compact for installation in spacefaring vehicles and space stations.

It is a further object of the present invention that the system is easy to use for bathing.

In one aspect, disclosed is a system and method for dry shower using air under low pressure in a sealed environment to remove dirt and dead skin from the body.

In one aspect, disclosed is a system for cleaning a body of a person, the system comprising an envelope that extends between a top member and a base member; a plurality of rings disposed between the top member and the base member, the plurality of rings, the envelope, the top member, and the base member define an enclosure of the system, the enclosure has an inner volume, the plurality of rings are spaced apart from each other and from the top member and the base member; and a plurality of nozzles disposed along a circumference of each ring of the plurality of rings, the plurality of nozzles in fluid communication with an air pump and the inner volume.

In one implementation of the system, the system further includes a plurality of air intake ports in fluid communication with the inner volume of the enclosure and a vacuum source. The enclosure can collapse downwards, wherein the top member and the plurality of rings are configured to stack one above another, wherein the enclosure is further configured to expand upwards from the collapsed state. The system can further reciprocate the plurality of rings up and down within a predetermined range. The plurality of nozzles are tubular, wherein the plurality of nozzles are configured to be extended and retracted for increasing or decreasing lengths of the plurality of nozzles respectively. The plurality of nozzles are configured to dangle randomly due to air under low pressure delivered from the air pump. The top member further includes a skirt, the skirt configured to expand and surround a neck of a person upstanding on the base member, the skirt further configured to retract from the expanded state. The envelope is made from a flexible sheet.

In one aspect, disclosed is a method for cleaning a body of a person, the method includes the steps of providing a system comprising an envelope that extends between a top member and a base member; a plurality of rings disposed between the top member and the base member, the plurality of rings, the envelope, the top member, and the base member define an enclosure of the system, the enclosure has an inner volume, the plurality of rings are spaced apart from each other and from the top member and the base member; and a plurality of nozzles disposed along a circumference of each ring of the plurality of rings, the plurality of nozzles in fluid communication with an air pump and the inner volume, wherein the enclosure is configured to switch between a collapsed state and an expanded state, standing on the base member, wherein the person upstands on the base, while the system is in the collapsed state; expanding the enclosure upwards from the collapsed state to the expanded state, wherein the enclosure is configured to enclose the body of the person below a neck; impinging streams of air under low pressure on the body of the person through the plurality of nozzles.

In one implementation of the method, the system further includes a plurality of air intake ports in fluid communication with the inner volume of the enclosure and a vacuum source, wherein the method further includes the steps of drawing air from the inner volume by the vacuum source through the plurality of air intake ports. The top member and the plurality of rings can stack one above another in the collapsed state, wherein the enclosure can further expand upwards from the collapsed state. The system further configured to move the plurality of rings up and down within a predetermined range, wherein the method further includes the steps of moving the plurality of rings reciprocate up and down while impinging the streams of air. The plurality of nozzles are tubular, wherein the plurality of nozzles are configured to be extended and retracted for increasing or decreasing lengths of the plurality of nozzles respectively. The plurality of nozzles can dangle randomly due to air under low pressure delivered from the air pump. The top member further includes a skirt, the skirt configured to expand and surround the neck of the person, the skirt further configured to retract from the expanded state. The envelope is made from a flexible sheet.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

Disclosed is a system and method for dry shower using air under low pressure in a sealed environment to remove dirt and dead skin from the body. The disclosed system can be of particular use in deep and long human space missions where water is not readily available for bathing. The disclosed system can give the feeling of bathing in space missions without using water and can provide for body hygiene and mental satisfaction of getting a bath.

Figure 1:
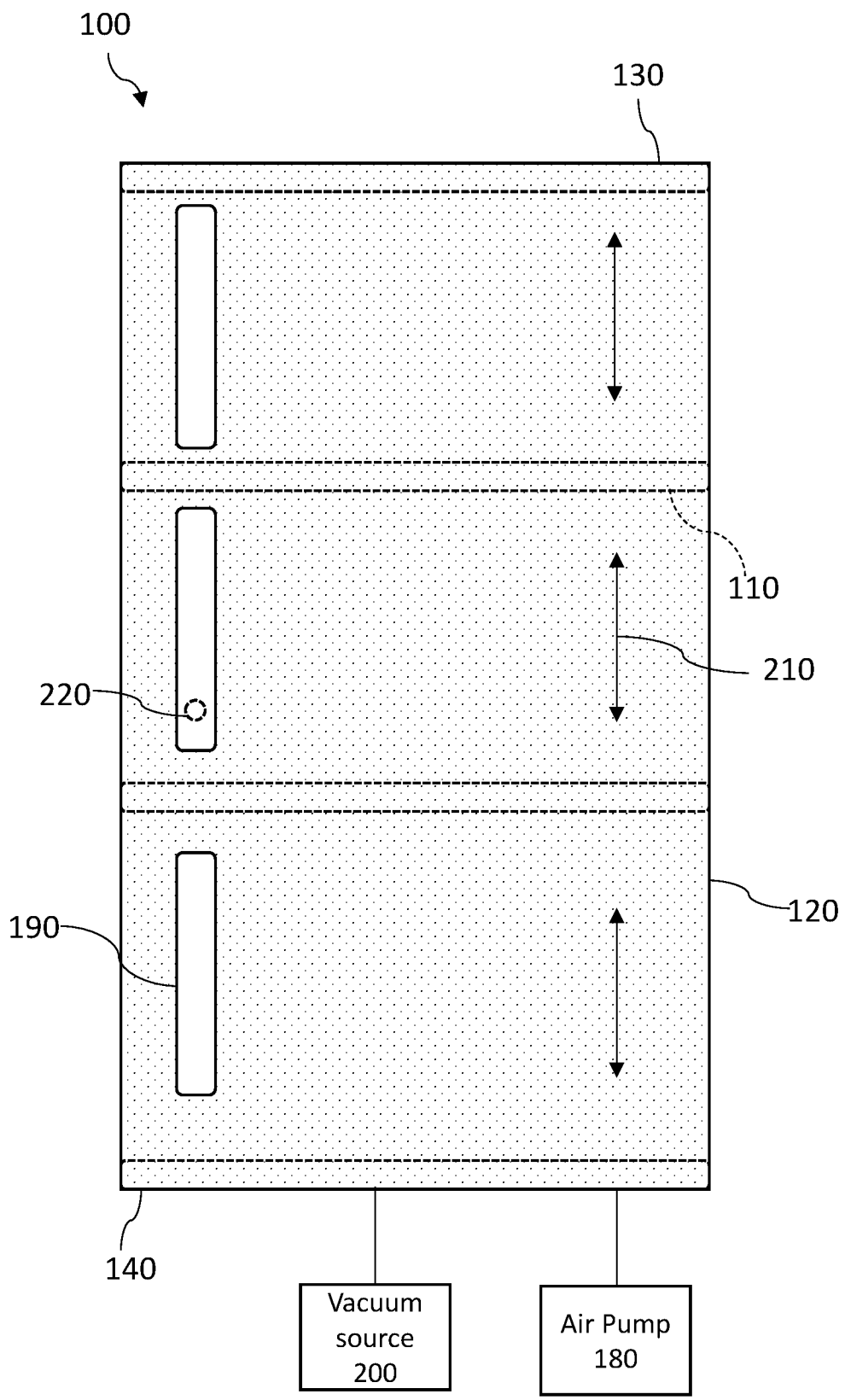
FIG. 1 is a schematic planar side view of the system, according to an exemplary embodiment of the present invention.

Referring to FIG. 1 which shows a schematic view of an exemplary embodiment of the disclosed system 100. The system 100 can include a plurality of rigid rings 110. The rings 110 are hidden by an envelope 120 and are shown in broken lines for illustration. The diameter of each ring can be such that a person of standard body weight and height can easily stand within an enclosure formed by the rings. The system can include two or more rings connected to envelope 120. The rings 110 on the envelope 120 can be spaced apart from each other. FIG. 1 shows a top member 130, which can be different or similar to the rings 110. At the bottom can be a base member 140 which can different or similar to the ring 110. The base can stabilize the disclosed system 100, such as on a floor. Envelope 120 can be made from a flexible sheet and can be cylindrical in shape. The material of the flexible sheet can be durable and at least impermeable to air. The length of the cylindrical envelope can be at least a height of a standard person, such as about 5-7 feet. In one case, the diameter of the enclosure can be about 3-4 inches and the height of the enclosure can be about 4.5-6.5 inches. The base and the envelope can define the inner volume of the enclosure.

Figure 2:
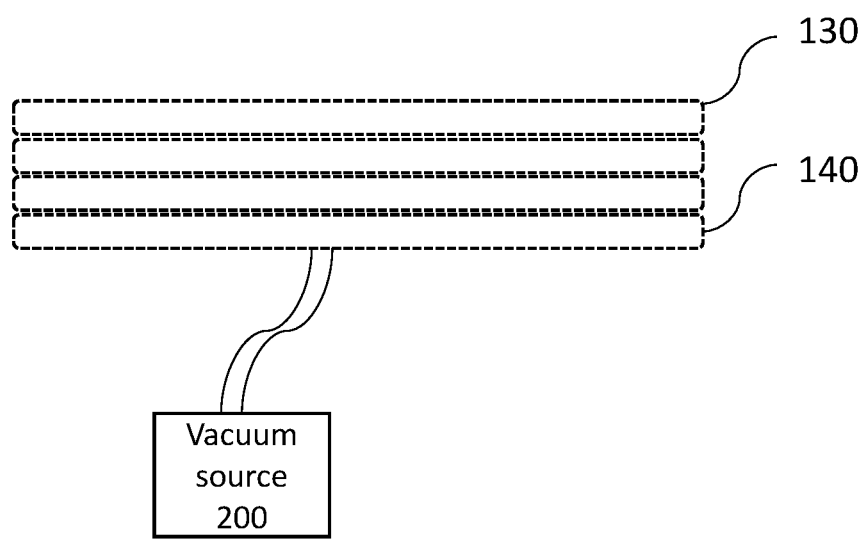
FIG. 2 shows the top member, the base member, and the rings in a collapsed state, according to an exemplary embodiment of the present invention.

A top periphery of the cylindrical envelope 120 can bond to an outer surface of the top member 130. The rings 110 can be at spaced intervals throughout the length of the cylindrical envelope 120 between the top member and the base member. The top member 130 and the rings 110 can collapse upon the base 140 of the system 100. A bottom periphery of the envelope 120 can bond to a base member 140. The rings 110 can also bond to envelope 120. FIG. 2 shows the system 100 in a collapsed state. For clarity, the envelope in FIG. 2 is omitted. The top member and the rings can collapse while the system is not in use.

Figure 3:
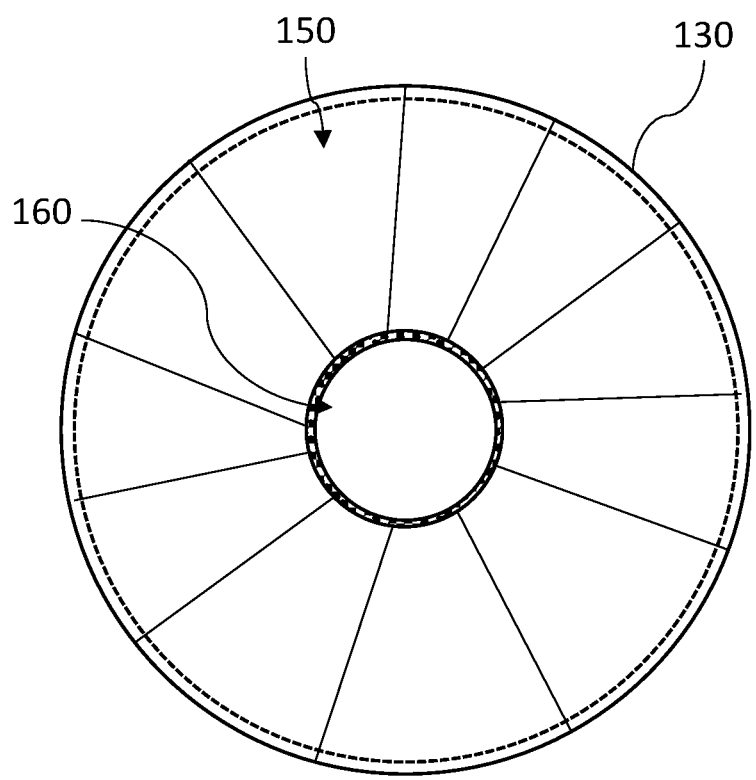
FIG. 3 is a top view of the system showing the top member and a skirt, according to an exemplary embodiment of the present invention.

FIG. 3 shows a top view of system 100 having a skirt 150 that at its outer periphery can be bonded to the top member 130. The skirt 150 can have many folds for resiliency and flexibility. The skirt 150 can also include a central opening 160 formed by an inner periphery of the skirt 150. The inner periphery of the skirt can have suitable elasticity that allows increasing the diameter of the central opening 160. To use the system 100, a person can step onto the base 140 through central opening 160. Once, the person is on the base, the enclosure can expand upwards from the collapsed state as shown in FIG. 1 to an expanded state as shown in FIG. 1. The inner periphery of the skirt 150 can surround the neck of the person, enclosing the body of the person below the neck within the enclosure, while the head can remain out of the enclosure. The elasticity of the inner periphery of the skirt can allow a partially sealed environment inside the enclosure. It is understood that the elastic inner periphery of the skirt 150 can be substituted by any other fastening mechanism, such as a hook and loop fastener, without departing from the scope of the present invention.

Figure 4:
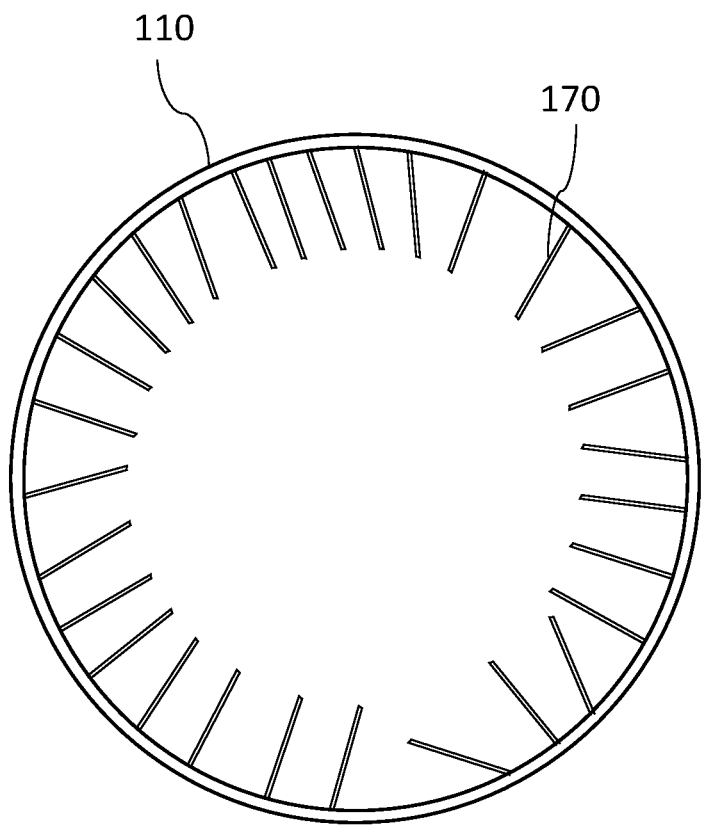
FIG. 4 is a top view of a ring showing the tubular nozzles in an extended state, according to an exemplary embodiment of the present invention.

Referring to FIG. 4 which shows a top view of one of the rings 110. Along a circumference of the ring can be several nozzles 170 spaced at regular intervals. Through these nozzles can be deliver air under pressure. The nozzle can be tubes made of semi-rigid materials, and the opening of the nozzles can be such that to focus a stream of air. The nozzles can extend and retract, such that to increase or decrease their length. The nozzles can be in all the rings 110 and optionally in the top member and the base member. The nozzles can connect to an air source, shown in FIG. 1, as an air pump 180. The air pump 180 can deliver air under pressure, and preferably, under low pressure to the nozzles. The nozzles can dangle or swing due to the passing air under pressure. Moreover, the pressure of the air can change continuously to further impart dandling motion to the nozzles. The nozzles 170 in the rings can be in fluid communication with the air pump 180 through a suitable conduit.

Again, referring to FIG. 1, the disclosed system 100 can further include suitable air intake ports 220 (shows position of air intake ports) that open into the inner volume of the enclosure. The intake ports can suitably position within the enclosure such that to draw air from the inner volume of the enclosure. FIG. 1 shows elongated strips 190 encasing the air intake ports. The air intake ports can be connected to a vacuum source 200 to draw air through the air intake ports from the inner volume of the enclosure.

To use the disclosed system for cleaning bodies, a person can stand on the base with the collapsed rings around his feet. Once, the user is in place, the enclosure can expand vertically, such that to surround the body of the person. The skirt of the top member can wrap around the neck of the person. Now air under lower pressure can impinge on the body of the person through the nozzles. The focused stream of air through strategically angled nozzles can knock off dirt and dead skin from the body. The dangling of the nozzles can direct the air to different areas of the body. Moreover, the rings can reciprocate up and down in a direction shown by arrow 210. Preferably, the rings can move up and down about twelve inches. In certain embodiments, the rings other than the top member and the base member may not bond to the envelope and can move up and down independent of the envelope. The air with the suspended dirt and dead skins can be drawn by the air intake ports under vacuum from the vacuum source 200.

What is claimed is:

1. A system for cleaning a body of a person, the system comprising:
    an envelope that extends between a top member and a base member;
    a plurality of rings disposed between the top member and the base member, the plurality of rings, the envelope, the top member, and the base member define an enclosure of the system, the enclosure has an inner volume, the plurality of rings are spaced apart from each other and from the top member and the base member; and
    a plurality of nozzles disposed along a circumference of each ring of the plurality of rings, the plurality of nozzles in fluid communication with an air pump and the inner volume.

2. The system according to claim 1, wherein the system further comprises:
    a plurality of air intake ports in fluid communication with the inner volume of the enclosure and a vacuum source.

3. The system according to claim 1, wherein the enclosure is configured to collapse downwards to a collapsed state, wherein the top member and the plurality of rings are configured to stack one above another, wherein the enclosure is further configured to expand upwards to an expanded state from the collapsed state.

4. The system according to claim 3, wherein the system is further configured to reciprocate the plurality of rings up and down within a predetermined range.

5. The system according to claim 1, wherein the plurality of nozzles are tubular, wherein the plurality of nozzles are configured to extend and retract for increasing or decreasing lengths of the plurality of nozzles respectively.

6. The system according to claim 5, wherein the plurality of nozzles are configured to dangle randomly due to air under low pressure delivered from the air pump.

7. The system according to claim 1, wherein the top member further comprises a skirt, the skirt configured to expand and surround a neck of the person upstanding on the base member, the skirt further configured to retract from the expanded state.

8. The system according to claim 1, wherein the envelope is made from a flexible sheet.

9. A method for cleaning a body of a person, the method comprising the steps of:
    providing a system comprising:
        an envelope that extends between a top member and a base member,
        a plurality of rings disposed between the top member and the base member, the plurality of rings, the envelope, the top member, and the base member define an enclosure of the system, the enclosure has an inner volume, the plurality of rings are spaced apart from each other and from the top member and the base member, and
        a plurality of nozzles disposed along a circumference of each ring of the plurality of rings, the plurality of nozzles in fluid communication with an air pump and the inner volume,
        wherein the enclosure is configured to switch between a collapsed state and an expanded state;
    putting a person on the base member, wherein the person upstands on the base member while the system is in the collapsed state;
    expanding the enclosure upwards from the collapsed state to the expanded state, wherein the enclosure is configured to enclose the body of the person below a neck; and
    impinging streams of air under low pressure on the body of the person through the plurality of nozzles.

10. The method according to claim 9, wherein the system further comprises a plurality of air intake ports in fluid communication with the inner volume of the enclosure and a vacuum source, wherein the method further comprises the steps of:
    drawing air from the inner volume by the vacuum source through the plurality of air intake ports.

11. The method according to claim 9, wherein the top member and the plurality of rings are configured to stack one above another in the collapsed state, wherein the enclosure is further configured to expand upwards from the collapsed state.

12. The method according to claim 9, wherein the system further configured to move the plurality of rings up and down within a predetermined range, wherein the method further comprises the steps of:
    reciprocating the plurality of rings up and down while impinging the streams of air.

13. The method according to claim 9, wherein the plurality of nozzles are tubular, wherein the plurality of nozzles are configured to be extended and retracted for increasing or decreasing lengths of the plurality of nozzles respectively.

14. The method according to claim 13, wherein the plurality of nozzles are configured to dangle randomly due to air under low pressure delivered from the air pump.

15. The method according to claim 9, wherein the top member further comprises a skirt, the skirt configured to expand and surround the neck of the person, the skirt further configured to retract from the expanded state.

16. The method according to claim 9, wherein the envelope is made from a flexible sheet.

* * * * *